United States Patent
Raney et al.

(10) Patent No.: US 7,364,079 B2
(45) Date of Patent: Apr. 29, 2008

(54) TRACKING LABEL

(75) Inventors: Brent A. Raney, Sterling, VA (US); Daryl S. Hamilton, Hyattsville, MD (US); Anthony M. Ferlaino, Jr., Fairfax, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 10/468,297

(22) PCT Filed: Feb. 21, 2002

(86) PCT No.: PCT/US02/03396

§ 371 (c)(1),
(2), (4) Date: Aug. 20, 2003

(87) PCT Pub. No.: WO02/069245

PCT Pub. Date: Sep. 6, 2002

(65) Prior Publication Data

US 2004/0074977 A1 Apr. 22, 2004

Related U.S. Application Data

(60) Provisional application No. 60/269,971, filed on Feb. 21, 2001.

(51) Int. Cl.
*G06K 7/10* (2006.01)

(52) U.S. Cl. .................. 235/462.01; 705/406; 705/408

(58) Field of Classification Search .......... 235/462.01, 235/385; 705/406, 408; 283/61, 79
See application file for complete search history.

(56) References Cited

U.S. PATENT DOCUMENTS

| | | | |
|---|---|---|---|
| 3,409,129 A | 11/1968 | Sperry | |
| 5,043,908 A | 8/1991 | Manduley et al. | |
| 5,138,140 A | 8/1992 | Siemiatkowski et al. | ... 235/462 |
| 5,177,368 A | 1/1993 | Kay | ............ 250/566 |
| 5,208,762 A | 5/1993 | Charhut et al. | ............ 364/478 |
| 5,216,620 A * | 6/1993 | Sansone | ............ 705/406 |
| 5,292,008 A * | 3/1994 | Sansone et al. | ............ 209/584 |
| 5,325,303 A * | 6/1994 | Walz et al. | ............ 705/404 |
| 5,388,049 A * | 2/1995 | Sansone et al. | ............ 705/406 |
| 5,421,778 A * | 6/1995 | Kouramanis | ............ 283/79 |

(Continued)

FOREIGN PATENT DOCUMENTS

JP 5-40841 2/1993

OTHER PUBLICATIONS

United States Postal Service Special Services Technical Guide: Postal Forms and Labels (Domestic Service Only) Publication 109, Updated notice, Mar. 23, 2001.

(Continued)

*Primary Examiner*—Uyen-Chau N Le
(74) *Attorney, Agent, or Firm*—Finnegan, Henderson, Farabow, Garrett & Dunner, LLP (57) ABSTRACT

An improved tracking label may comprise a destination ZIP field (130), content identifier number (CIN) description field (115), and a barcode field (150). In addition, the improved label comprises at least one of a printer line field (105), a postal destination name field (110), a mailer name field (120), a mailer identification (ID) field (125), a route field (135), a barcode numermic line field (140) and a mailer's area field (145).

15 Claims, 3 Drawing Sheets

U.S. PATENT DOCUMENTS

| | | | |
|---|---|---|---|
| 5,470,427 A * | 11/1995 | Mikel et al. ................. 156/387 |
| 5,478,184 A | 12/1995 | Bryant et al. |
| 5,586,036 A * | 12/1996 | Pintsov ....................... 705/408 |
| 5,602,382 A * | 2/1997 | Ulvr et al. ............. 235/462.02 |
| 5,612,889 A * | 3/1997 | Pintsov et al. .............. 700/226 |
| 5,697,648 A * | 12/1997 | Petkovsek ..................... 283/61 |
| 5,726,431 A * | 3/1998 | VanDonkelaar et al. .... 235/383 |
| 5,880,443 A * | 3/1999 | McDonald et al. ......... 235/375 |
| 5,880,451 A * | 3/1999 | Smith et al. ............. 235/462.1 |
| 5,915,730 A * | 6/1999 | Petkovsek ..................... 283/79 |
| 5,951,053 A | 9/1999 | Petkovsek ..................... 283/81 |
| 5,971,587 A * | 10/1999 | Kato et al. .................. 700/115 |
| 6,011,758 A | 1/2000 | Dockes et al. ................ 369/30 |
| 6,035,291 A | 3/2000 | Thiel .......................... 705/408 |
| 6,035,391 A | 3/2000 | Isaman |
| 6,089,613 A * | 7/2000 | Petkovsek ..................... 283/79 |
| 6,134,561 A * | 10/2000 | Brandien et al. ........ 707/104.1 |
| 6,154,733 A | 11/2000 | Pierce et al. ................ 705/408 |
| 6,186,554 B1 * | 2/2001 | Raming ........................ 283/81 |
| 6,201,203 B1 | 3/2001 | Tilles |
| 6,203,068 B1 * | 3/2001 | Petkovsek ..................... 283/79 |
| 6,208,910 B1 | 3/2001 | Micheal et al. |
| 6,283,304 B1 | 9/2001 | Gotlieb et al. |
| 6,321,992 B1 | 11/2001 | Knowles et al. ....... 235/478.01 |
| 6,338,434 B1 | 1/2002 | Wilz, Sr. et al. ........ 235/462.01 |
| 6,398,112 B1 * | 6/2002 | Li et al. ................ 235/462.01 |
| 6,839,138 B2 | 1/2005 | Welchman et al. |
| 6,863,310 B1 * | 3/2005 | Petkovsek ..................... 283/79 |
| 6,953,906 B2 | 10/2005 | Burns et al. |
| 2002/0065717 A1 | 5/2002 | Miller et al. |
| 2005/0075997 A1 | 4/2005 | Raney et al. |

OTHER PUBLICATIONS

Japio abstract of JP 5-40841.
International Search Report dated Jun. 12, 2002 in application PCT/US02/03396.
International Search Report dated Jun. 7, 2002 in application PCT/US02/03395.
International Search Report dated May 22, 2002 in application PCT/US02/03393.
International Search Report dated Aug. 7, 2002 in application PCT/US02/03394.

* cited by examiner

| Process Flow | Data Elements | | | | | | | | | |
|---|---|---|---|---|---|---|---|---|---|---|
| | 1 2 3 4 5 6 7 8 | 9 | 10 | 11 12 13 14 15 | 16 | 17 | 18 | 19 20 21 22 23 | 24 |
| Plant to Plant | ZIP – 3 or 5 digit | CIN | DOD | MPC | Machine ID | Label Source | Printer Port | | Serial Number | Label Type (4) |
| Plant to DU | ZIP – 3 or 5 digit | CIN | DOD | MPC | Machine ID | Label Source | Printer Port | Hold out ID | Serial Number | Label Type (5) |
| Plant to Exchange Office/ISC | ZIP – 3 or 5 digit | CIN | DOD | MPC | Machine ID | Label Source | Printer Port | | Serial Number | Label Type (6) |
| DU to Plant | ZIP – 3 or 5 digit | CIN | * | MPC | Last Facility | Label Source | Printer Port | | Serial Number | Label Type (7) |

| Process Flow | Data Elements | | | | | | | |
|---|---|---|---|---|---|---|---|---|
| | 1 2 3 4 5 6 7 8 | 9 | 10 | 11 12 13 14 | 15 16 | 17 | 18 19 20 21 22 23 | 24 |
| Operation to Operation | ZIP – 3 or 5 digit | CIN | • | MPC | Machine ID | Label Printer Source Port | Serial Number | Label Type (2) |
| ISS to OSS | ZIP – 3 or 5 digit | CIN | DOD | MPC | Machine ID | Label Printer Source Port | Serial Number / ISS Time | Label Type (3) |

FIG. 6

TRACKING LABEL

RELATED APPLICATIONS

Under provisions of 35 U.S.C. § 119(e), Applicants claim the benefit of U.S. Provisional Application No. 60/269,971, filed Feb. 21, 2001, which is incorporated herein by reference. PCT Patent Applications Ser. Nos. PCT/US02/03394, PCT/US02/03393, and PCT/US02/03395, filed on even date herewith, each in the name of Brent A. Raney, et al. and entitled "SYSTEMS AND METHODS FOR PROCESSING ITEMS IN AN ITEM DELIVERY SYSTEM", "SYSTEMS AND METHODS FOR PRODUCING AND MANAGING A TRACKING LABEL IN A AN ITEM DELIVERY SYSTEM", and "SYSTEMS AND METHODS FOR UTILIZING A TRACKING LABEL IN AN ITEM DELIVERY SYSTEM," respectively, and each assigned to the assignee of the present application, are hereby incorporated by reference.

DESCRIPTION OF THE INVENTION

1. Field of the Invention

The invention relates generally to systems and methods for processing items in an item delivery system, and more particularly, to systems and methods for providing an improved tracking label for items passing through an item delivery system.

2. Background of the Invention

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages and other items. In an effort to lower operating costs and increase value for their customer base, many high volume delivery users prepare packages and other items with automated equipment and presort and label the items prior to placement of the items into an item delivery system. These customers, along with other senders, wish to track items as they pass through various points in the item delivery system.

Therefore, the need to efficiently process items in an item delivery system has become a common need for many item delivery system operators. More specifically, providing an improved tracking label for items passing through an item delivery system has become a critical need for many item delivery system operators. This is because in an increasingly competitive environment, meeting and exceeding the expectations of senders or others who receive services is essential for item delivery system operators.

Conventional systems and methods often do not allow for the tracking of items. Rather, conventional systems merely provide routing information. For example, conventional systems provide information that allows items to be sent from point A to point B and do not track where the item came from, who prepared the item, when the item was prepared, or where the item is in the item delivery system.

With prior art systems and methods, for example, there can be hundreds of tracking indicia that are identical for different items going to the same place. When problems are detected in conventional systems, for example, an incorrect label or an incorrect method of preparing the item has occurred, there is no way to track exactly when, where, or how the problem was created. Therefore, no means exists to identify and correct the problem.

Thus, there remains a need for efficiently processing items in an item delivery system. In addition, there remains a need for providing an improved tracking label for items passing through an item delivery system.

SUMMARY OF THE INVENTION

Consistent with the present invention, systems and methods for providing an improved tracking label for items passing through an item delivery system are provided that avoid problems associated with prior art tracking labels for items passing through an item delivery system as discussed herein above.

In one aspect, an improved tracking label comprises a destination ZIP field, content identifier number (CIN) description field, a bar code field, and at least one of a printer line field, a postal destination name field, a mailer name field, a mailer ID field, a route field, a bar code numeric line field, and a mailer's area field.

In another aspect, an improved tracking label comprises a destination ZIP field, content identifier number (CIN) description field, a bar code field, and at least one of a printer line field, a postal destination name field, a last facility field, a route field, a bar code numeric line field, a day of delivery field, a tray sequence field, a dock door field, a transportation code field, and a no linear measurement code field.

In yet another aspect, an improved tracking label comprises a destination ZIP field, content identifier number (CIN) description field, a bar code field, and at least one of a printer line field, a next operations field, a machine ID name field, a sort plan field, a bar code numeric line field, an in house field, an ISS priority field, an ISS time field, and a bin field.

In yet another aspect, an improved bar code used in conjunction with a tracking label, the bar code including data comprises a ZIP code, a content identifier number (CIN), and at least one of a mailer ID, a customer subgroup ID, a label source, a printer port, a serial number, a label type, a day of delivery (DOD), a mail processing code (MPC), machine ID, a last facility, a hold out ID, and an ISS time.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DESCRIPTION OF THE EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

Items used in conjunction with embodiments of the present invention may comprise a mailpiece, a United States Postal Service Priority Mail package, or a United States Postal Service Express Mail package. Moreover, a plurality of items may pass through portions of an item delivery system gathered into containers, such as, trays, sacks, or tubs, as are known by those of ordinary skill in the art.

Related PCT Patent Applications Ser. Nos. PCT/US02/03394, PCT/US02/03393, and PCT/US02/03395, entitled "SYSTEMS AND METHODS FOR PROCESSING ITEMS IN AN ITEM DELIVERY SYSTEM", "SYSTEMS AND METHODS FOR PRODUCING AND MANAGING A TRACKING LABEL IN A AN ITEM DELIVERY SYSTEM", and "SYSTEMS AND METHODS FOR UTILIZING A TRACKING LABEL IN AN ITEM DELIVERY SYSTEM" respectively, which have previously been incorporated by reference, describe exemplary processes, servers, systems, devices, and equipment that may be used in conjunction with embodiments of the present invention. Those of ordinary skill in the art, however, will appreciate that other types of processes, servers, systems, devices, and equipment may be used in conjunction with embodiments of the present invention also.

A 24-digit Code 128 bar code may be utilized in conjunction with embodiments of the present invention. The bar code may be printed in an area that runs the full width of a label, for example, (3.3 to 3.5 inches) from 0.50 to 1.61 inches from the top of the label (1.110 inches). This area may include the bar code and the required clear zones above, below, and to the right and left of the bar code. The bar code may be left justified and may be at least 0.250 inch from the left edge of the label. The height of the bar code may be 0.75 inch.

Two quiet zones (clear areas) may be maintained, one to the left and one to the right of the bar code, each measuring at least 10 times the X dimension and extending the full height of the bar code, for example. Two additional quiet zones may be maintained, one above and one below the bar code for its full width, each measuring at least 10 times the X dimension, for example. The quiet zones may meet the space reflectance specification. When measured in the red spectral range between 640 nanometers and 675 nanometers, the minimum white bar (space) reflectance (Rs) may be greater than 50 percent, and the maximum bar reflectance (Rb) may be less than 25 percent. The minimum print reflectance difference (Rs-Rb) may be 40 percent. Reflectance may be measured with a item delivery system operator specified reflectance meter or bar code verifier.

An improved tracking label consistent with embodiments of the present invention may contain information relative to label type, mailer ID, customer subgroup ID, serial number, machine ID, input sub system (ISS) time, hold out ID, last facility, label source, and printer port.

An improved tracking label consistent with embodiments of the present invention may be used in conjunction with three mail (or other items) flows that, when consolidated, may reflect the movement of mail or other items from their origin (the customer for example) to its final destination (a delivery address for example). The three mail flows may comprise, for example; (1) customers, such as business mailers, providing mail to the item deliver system operator in mailer-generated trays, (2) item deliver system operator inter-facility tray or other item movement, and (3) internal plant level processes that sort the mail or other items (item deliver system operator intra-facility tray movement for example). During each of these flows, numerous trays or other items may be created, as well as emptied, as a unit load. The implication of these three flows, for example, may generate three sets of information requirements that may ultimately impact the physical format and design of the tracking label consistent with embodiments of the present. These formats may be referred to as the mailer label, the inter-facility label, and the intra-facility label formats.

The mailer label format may not require any unique lower level mail flow definitions, therefore, it is may be recognized as a label type. The mailer label format may reflect mailer-generated trays, for example, coming from a customer to any postal facility. The inter-facility label format may reflect information requirements which define four lower levels of unique mail flows, for example, plant-to-plant, delivery unit (DU) to a plant, plant to a DU, and plant to an exchange office or international service center (ISC). Plant-to-plant flows may include flows to/from bulk mail centers (BMCs) and priority mail processing centers (PMPCs), for example.

The intra-facility label format may define two lower level format types. They may include, remote bar coding system (RBCS) flows, input sub system (ISS) to output sub system (OSS) resolution time, and all other intra-facility flows.

Embodiments of the present invention may include either a mailer ID or machine ID that may comprise a 5-digit identifier that uniquely identifies either an entity that prepared the particular item or a machine that processed the particular item. It may also include a label source that identifies the entity that prints the label or barcode, and may also identify up to ten different sources producing the label. The printer port may identify up to ten individual printers or the specific device that produces the label. This data may be used for quality control purposes.

A serialization ID may be used with embodiments of the present invention that allows for the sequentialization and creation of a unique identifier within the bar code structure. In addition, a label type may be included comprising a 1-digit label type code that may allow for the identification of any of the aforementioned operational flows.

Figure 1:
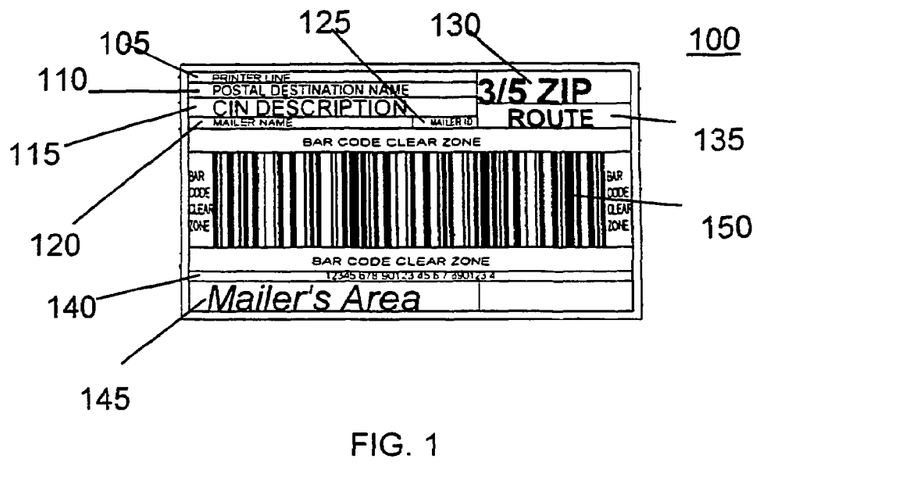
FIG. 1 is an illustration of an exemplary label consistent with an embodiment of the present invention.

FIG. 1 shows an exemplary mailer label 100 consistent with an embodiment of the invention comprising a plurality of fields. These fields may include a printer line 105, a postal destination name 110, a content identifier number (CIN) description 115, a mailer name 120, a mailer ID 125, a destination ZIP 130, a route 135, a bar code numeric line 140, a mailer's area 145, and a bar code 150. Mailer label 100 may have a dimension of 2.0 inches by 3.5 inches, however, those skilled in the art will many different sizes may be employed.

Printer line field 105 is a field is for printer specific information. Contents of this field may be left justified with a 0.25-inch offset and may have a maximum font size of 6-point sans serif type. The maximum number of characters permitted may be 35. The contents of this field can begin at the left edge of the label and may extend up to 2.25 inches from the left edge. Printer line field 105 may not fall below 0.175 inch from the top edge of the label.

Destination name field 110 may contain the name of the postal location associated with destination ZIP field 130 for example. Contents may be left justified with a 0.25-inch offset, may be upper case, and may have a maximum font size of 10-point sans serif type. The maximum number of characters may be 21. The contents of this field may begin at the left edge of the label and may extend up to 2.25 inches from the left edge. The destination name field 110 may not fall below 0.30 inch from the top edge of the label.

CIN description field 115 may contain the CIN description. CIN description field 115 may be left justified with a 0.25-inch offset, upper case, and may be no more than 21 characters in length. The maximum font size may be 12-point sans serif type. The contents of this line may begin at the left edge of the label and may extend up to 2.25 inches from the left edge. CIN description field 115 may not fall below 0.45 inch from the top edge of the label.

Mailer name field 120 may identify the mailing entity that prepared (built) the item. The font may be no larger than 6-point sans serif type. The contents of this field may begin at the left edge of the label, with a 0.25-inch offset and may extend up to 1.75 inches from the left edge. Mailer name field 120 may not fall below 0.55 inch from the top edge of the label and may be no more than 25 characters in length.

Mailer ID field 125 may hold the mailer's ID. The mailer ID may be derived from a marketing system database, and may consist of the first five digits of a customer sub-group code. Those skilled in the art will appreciate that other data or databases may be used to identify a mailer or sender. The maximum font for this 5-digit numeric may be 6-point sans serif type. This data may be centered in an area that begins 1.75 inches from the left edge of the label and continues up to 2.25 inches from the left edge. Mailer ID field 125 may not fall below 0.55 inch from the top edge of the label.

Destination ZIP field 130 may contain the 3 or 5-digit ZIP code for the item's destination for example. The contents may have a font size of 20-point sans serif type. The contents of this field may be centered in an area beginning 2.25 inches from the left edge of the label and may extending up to the right edge (approximately 1.25 inches). Destination ZIP field 130 may not fall below 0.3625 inch from the top edge of the label.

Route field 135 may contain a carrier route, a post office box, or a firm holdout, for example, of the final destination of the item's contents. The route may be designated, for example, as specified by Section MO14.2 of the US Postal Service's Domestic Mail Manual (DMM), however, those of ordinary skill in the art will appreciate that there are many ways to designate this field. The contents may have a font size of 14-point sans serif type. The contents of this field may be centered in an area beginning 2.25 inches from the left edge of the label and extending up to the right edge (approximately 1.25 inches). Route field 135 may not fall below 0.55 inch from the top edge of the label.

Bar code numeric line field 140 may contain, for example, a 24-digit numeric code representing the bar code, and may be printed below a bar code having a maximum character size of 6-point sans serif type. The 24-digit numeric code, for example, may be centered below the bar code. It may be printed below the bar code's clear zone and may fall no lower than 1.7375 inches from the top edge of the label.

Mailer's area 145 may be reserved for information generated by mailers or other senders. Bar codes may only be placed in this area, for example, with pre-approval of the delivery system operator. Fonts already designated for delivery system operator specified fields may not be used in this area. The contents of this field may be restricted to an area between 1.7125 and 1.9875 inches from the top edge of the label, beginning at the left edge of the label and extending up to 2.25 inches from the left edge.

Figure 2:
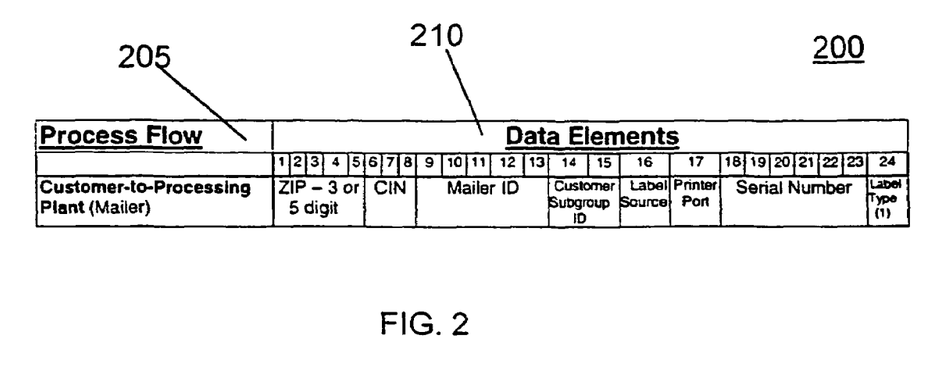
FIG. 2 is an illustration of an exemplary bar code content consistent with an embodiment of the present invention.

FIG. 2 shows an exemplary bar code content 200 that may be used in conjunction with exemplary mailer label 100 consistent with an embodiment of the present invention. FIG. 2 illustrates a single mail flow in process flow section 205, specifically, customer-to-processing plant (mailer) flow. In addition, FIG. 2 illustrates the partitioning of data elements in data element section 210 for the specific process flows shown.

For mailer label 100, the first five digits of bar code 150 may contain the destination ZIP code and the next three digits may represent the CIN. The Mailer-to-Plant Label process flow may use the next five digits to identify the mailer or sender. This 5-digit field may be derived from, for example, the CBCIS customer sub-account code currently assigned by the United States Postal Service. The CBCIS record may also contain the customers DUNS number where applicable. Digits 14 and 15 of data elements section 210 may contain a customer subgroup ID provided by the mailer or sender.

Digit 16 of data element section 210 may identify the type of tray label production system that printed the label and digit 17 may identify the printer that may generate the tray label. These two data elements may not only provide source information for managing the unique identification and serialization of tray labels, but they may also provide information which may be used to identify and isolate equipment that is not meeting print quality standards.

For postal applications, for example, the number of printers attached to a 24-digit on-demand printer system may never exceed ten units on a single workstation. However, if the number of printers assigned to a production workstation did exceed 10 printers, digit 17 may be used to identify the printers by groups of two, three, or more, for example.

The next six digits (18 through 23) of bar code 150 may be reserved for a serial number of the unit load. The serial number, with other data in the bar code, may create a unique ID for each unit load. Each unique ID (serial number in combination with other data elements) may remain unique for a period of no less than 30 days. The last digit (digit 24) of data element section 210 may contain a label type. The ZIP code, CIN and label type may provide the information necessary to direct the tray to its destination.

Figure 3:
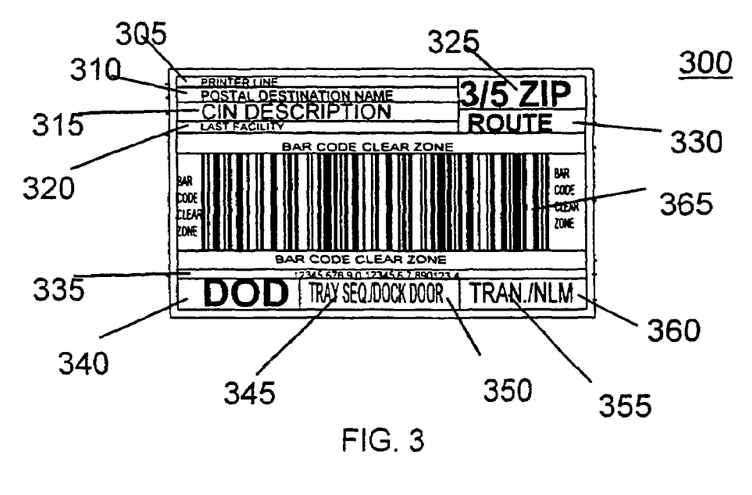
FIG. 3 is an illustration of an exemplary label consistent with an embodiment of the present invention.

FIG. 3 shows an exemplary inter-facility label 300 consistent with an embodiment of the present invention comprising a plurality of fields. These fields may include a printer line 305, a postal destination name 310, a CIN description 315, a last facility 320, a destination ZIP 325, a route 330, a bar code numeric line 335, a day of delivery 340, a tray sequence 345, a dock door 350, a transportation code 355, a no linear measurement code 360, and a bar code 365. Inter-facility label 300 may have a dimension of 1.9 inches by 3.3 inches, however, those skilled in the art will appreciate that many different sizes may be employed.

Printer line field 305 may comprise a field for printer specific information. Contents may be left justified with a 0.25-inch offset and may have a font size of 6-point sans serif type. The maximum number of characters permitted may be 35. The contents of this field may begin at the left edge of the label and may extend up to 2.25 inches from the left edge. Printer line field 305 may not fall below 0.125 inch from the top edge of the label.

Postal destination name 310, for example, may contain the name of the postal location associated with destination ZIP field 325. Contents are left justified with a 0.25-inch offset, are upper case, and have a range of 8 to 10-point sans serif font type. The maximum number of characters may be 21. The contents of this field may begin at the left edge of the label and may extend up to 2.25 inches from the left edge. Postal destination name field 310 may not fall below 0.25 inch from the top edge of the label.

CIN description field 315 may contain a content identifier number (CIN) description. CIN description field 315 may be left justified with a 0.25-inch offset, upper case, and no more than 21 characters in length. The font may range from 10 to 12-point sans serif type. The contents of this line begin at the left edge of the label and may extend up to 2.25 inches from the left edge. CIN description field 315 may not fall below 0.40 inch from the top edge of the label.

Last facility field 320 may identify a postal facility that last processed (built) the item. The font may be 6-point sans serif type. The contents of this field may begin at the left edge of the label, with a 0.25-inch offset, and may extend up to 2.25 inches from the left edge. Last facility field 320 may not fall below 0.50 inch from the top edge of the label and may be no more than 25 characters in length.

Destination ZIP field 325 may contain a 3 or 5-digit ZIP code for the tray's destination. The contents may have a font size of 20-point sans serif type. The contents of this field may be centered in an area beginning 2.25 inches from the left edge of the label and extending up to the right edge (approximately 1 inch). Destination ZIP field 325 may not fall below 0.3125 inch from the top edge of the label.

Route field 330 may contain a carrier route, post office box, or firm holdout of the final destination of the tray's contents. The route may be designated as specified by Section MO14.2 of the US Postal Service's Domestic Mail Manual (DMM), however, those of ordinary skill in the art will appreciate that there are many way to designate this field. The contents may have a font size of 14-point sans serif type. The contents of this field may be centered in an area beginning 2.25 inches from the left edge of the label and extending up to the right edge (approximately 1 inch). Route field 330 may not fall below 0.50 inch from the top edge of the label.

Bar code numeric line field 335 may contain, for example, a 24-digit numeric code represented by the bar code and may be printed below the bar code having a 6-point sans serif type. The 24-digit numeric code may be centered below the bar code. It may be printed below the bar code's clear zone and fall no lower than 1.6875 inches from the top edge of the label.

Day of delivery field 340 may contain the day of the week the item contents should be delivered per item delivery system operator's standards applicable to the item's contents. Day of delivery field 340 may have a font size ranging from 18 to 22-point sans serif type. The contents of this field may be centered in an area beginning at the left edge of the label and extending up to 1 inches from the left edge. The day of delivery field 340 may fall no lower than 1.9375 inches from the top edge of the label.

Tray sequence field 345 may identify the sequence of DPS trayed mail for delivery units. If tray sequence DPS and dock door information are both available, tray sequence DPS receives priority over dock door. The contents may be upper case and may have a font size ranging between 12 and 16-point sans serif type. The format of this field may be "DPS" with a 1-character alpha, plus an optional 3-character representation of the tray sequence based on the total number of trays in a wrap. The contents of this field may be centered in an area beginning 1 inch from the left edge of the label and extending up to 2.25 inches from the left edge. This field may not fall below 1.9375 inches from the top edge of the label.

Dock door field 350 may identify the assigned dock door for containerized tray mail to be dispatched. Since this field may be co-located with tray sequence field 345, it may only be used for non-DPS mail. The contents may be upper case and have a font size ranging between 14 and 16-point sans serif type. The format of this field may be a 4-character alphanumeric with the first three characters being the number of the dock door followed by an alpha representing the order of the departing container by numeric ZIP code order, for example. The contents of this field may be centered in an area beginning 1 inch from the left edge of the label and extending up to 2.25 inches from the left edge. This field may not fall below 1.9375 inches from the top edge of the label.

Transportation code field 355 may contain an air stop code used to designate the transportation code necessary to "flow" the item to its final destination, or may contain a Hub and Spoke (HASP) origin dispatch routing information. It may only be used in movements of trayed mail, for example, from plant-to-plant. The contents may be upper case and have a font size ranging between 12 and 16-point sans serif type. The contents of this field may be centered in an area beginning 2.25 inches from the left edge of the label and extending up to the right edge (approximately 1 inch). This field may not fall below 1.9375 inches from the top edge of the label.

No linear measurement code field 360 may identify item volume that may not require linear measurement by a delivery unit. Exact piece counts may be available electronically. This code may only be used in movements of items from a plant to a delivery unit. The contents may be upper case and have a font size ranging between 12 and 16-point sans serif type. The contents of this field may be centered in an area beginning 2.25 inches from the left edge of the label and extending up to the (approximately 1 inch). This field may not fall below 1.9375 inches from the top edge of the label.

Figure 4:
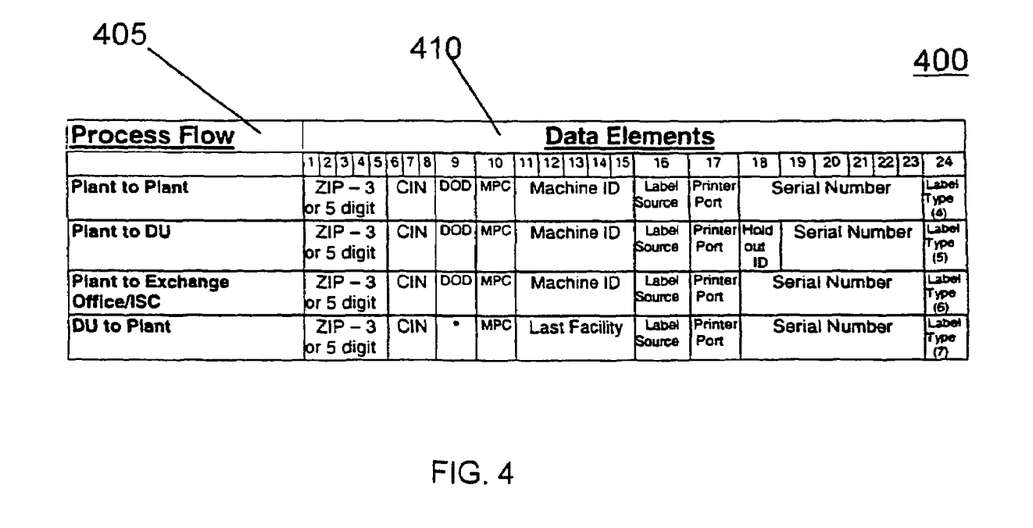
FIG. 4 is an illustration of an exemplary bar code content consistent with an embodiment of the present invention.

FIG. 4 shows an exemplary bar code content 400 that may be used in conjunction with exemplary inter-facility label 300 consistent with an embodiment of the present invention. FIG. 4 illustrates four mail flows in process flow section 405, specifically, plant to plant, plant to DU, plant to exchange office/ISC, and DU to plant. In addition, FIG. 4 illustrates the partitioning of data elements in data element section 410 for the specific process flows shown.

For inter-facility label 300, the first five digits of bar code 365 may contain the destination ZIP code. The next three digits (digits 6 through 8) represent the CIN and the DOD is represented by digit 9. As shown in FIG. 4, digit nine is unused in the DU-to-plant flow, and the empty data field may be zero-filled in the data stream. In all mail flow label types, empty data fields may be zero-filled. Digit 10 contains the MPC. Digit 10 (the MPC) may operate as a switch to enable or disable tray dispatch (beyond the plant's physical boundaries), and also may operate as a mechanism to signal the need for a first handling pieces (FHP) weight transaction.

The next five digits (digits 11 through 15) contain data regarding the specific piece of MPE that generated the tray. This 5-digit machine ID is used to identify the tray origin. The DU-to-plant process flow is the exception, and the 5-digit ZIP of the facility is used as the tray's origin in digits 11 through 15.

As shown by FIG. 4, digit 16 may identify the type of tray label production system that printed the label, and digit 17 may identify the printer that may generate the tray label. These last two data elements (of digits 16 and 17) may not only provide source information for managing the unique identification and serialization of tray labels, but they also may provide information that may be used to identify and isolate equipment that may not be meeting print quality standards. For postal applications, for example, the number of printers attached to a 24-digit on-demand printer system may never exceed ten units on a single workstation. However, if the number of printers assigned to a production workstation exceeds 10 printers, digit 17 may be used to identify the printers by groups of two, three, or more, for example.

The next six digits (digits 18 through 23) may be reserved for a serial number of the unit load. The exception is the Plant-to-DU flow where digit 18 may designate additional information regarding the final destination of the tray (Hold Out ID), and digits 19 through 23 may be reserved for the serial number of the unit load. The serial number, combined with other data in the bar code, may create a unique ID for each unit load. Each unique ID (serial number in combination with other data in the bar code) may remain unique for a period of no less than thirty days. The Plant-to-DU flow unique ID may remain unique for a period of no less than 7 days. The last digit of all four flows may contain the label type. The ZIP code, CIN, and label type, along with the mail processing code, may provide the information necessary to direct the tray to its destination.

Figure 5:
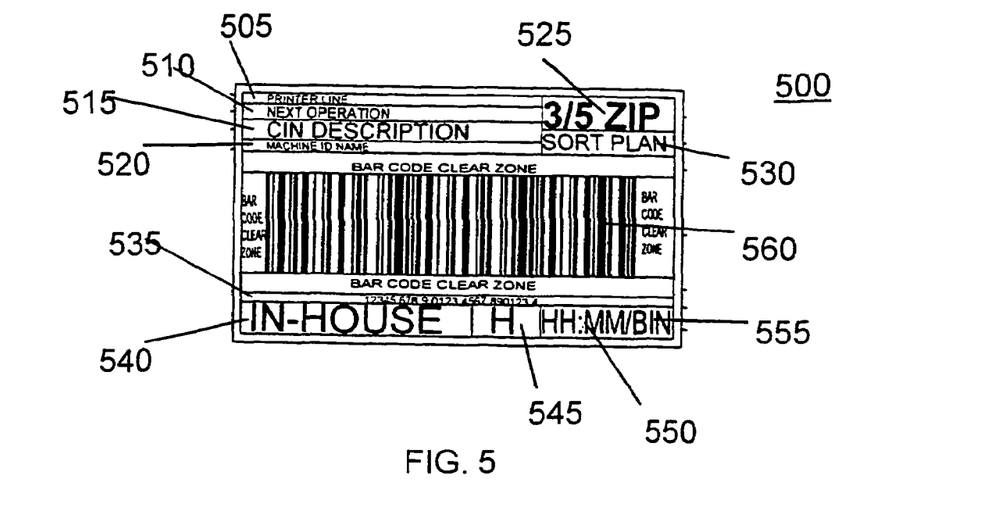
FIG. 5 is an illustration of an exemplary label consistent with an embodiment of the present invention.

FIG. 5 shows an exemplary intra-facility label 500 consistent with an embodiment of the present invention comprising a plurality of fields. These fields may include a printer line 505, a next operations 510, a CIN description 515, a machine ID name 520, a destination ZIP 525, a sort plan 530, a bar code numeric line 535, an in house 540, an ISS priority 545, an ISS time 550, a bin 555, and a bar code 560. Intra-facility label 500 may have a dimension of 1.9 inches by 3.3 inches, however, those skilled in the art will appreciate that many different sizes may be employed.

Printer line field 505 may comprise printer specific information. Contents may be left justified with a 0.25-inch offset and may be a font size of 6-point sans serif type. The maximum number of characters permitted may be 35. The contents of this field may begin at the left edge of the label and may extend up to 2.25 inches from the left edge. Printer line field 505 may not fall below 0.125 inch from the top edge of the label.

Next operations field 510 may identify the degree of item processing sortation for a unit load, for example, a tray. Contents may be left justified with a 0.25-inch offset, are upper case, and may have a font size ranging between 6 and 8-point sans serif type. The maximum number of characters may be 25. The contents of this field may begin at the left edge of the label and may extend up to 2.25 inches from the left edge. Next operations field 510 may not fall below 0.25 inch from the top edge of the label.

CIN description field 515 may contain the content identifier number (CIN) description. CIN description field 515 may be left justified with a 0.25-inch offset, upper case, and no more than 21 characters in length. The font size may range between 10 and 12-point sans serif type. The contents of this line may begin at the left edge of the label and may extend up to 2.25 inches from the left edge. CIN description field 515 may not fall below 0.40 inch from the top edge of the label.

Machine ID name field 520 may identify the name of the mail processing equipment that last processed (built) the item. The font may be 6-point sans serif type. The contents of this field may begin at the left edge of the label, with a 0.25-inch offset, and may extend up to 2.25 inches from the left edge. Machine ID name field 520 may not fall below 0.50 inch from the top edge of the label and not be longer than 25 characters in length.

Destination ZIP field 525 may contain a 3 or 5-digit ZIP code for a processing facility. The contents of this field may have a font size of 20-point sans serif type. The contents of this field may be centered in an area beginning 2.25 inches from the left edge of the label and extending up to the right edge (approximately 1 inch). Destination ZIP field 525 may not fall below 0.31 25 inch from the top edge of the label.

Sort plan field 530 may identify the next sort required to process the item. The contents of this field may be upper case and may have a font size of 14-point sans serif type. The contents of this field may be centered in an area beginning 2.25 inches from the left edge of the label and extending up to the right edge (approximately 1 inch). Sort plan field 530 may not fall below 0.50 inch from the top edge of the label.

Bar code numeric line field 535 may comprise a 24-digit numeric code, for example, represented by the bar code and may be printed below the bar code having a font size of 6-point sans serif type. Bar code numeric line field 535 may be centered below the bar code. It may be printed below the bar code's clear zone and may fall no lower than 1.6875 inches from the top edge of the label.

In house field 540 may contain the phrase "IN HOUSE", for example, and may be printed in a font size ranging between 18 to 22-point sans serif type. The contents of this field may be centered in an area beginning at the left edge of the label and extending up to 1.75 inches from the left edge. In house field 540 may not fall below 1.9375 inches from the top edge of the label.

ISS priority field 545 may identify the priority in processing selected items returning from an ISS. An upper case "H", printed in a font size ranging between 18 to of 22-point sans serif type, may designate high priority, and for low priority, the field may remain blank (empty). The contents of this field may be centered in an area beginning 1.75 inches from the left edge of the label and extending up to 2.25 inches from the left edge. This field may not fall below 1.9375 inches from the top edge of the label.

ISS time field 550 may identify the time when the last letter is placed in a tray coming from an ISS. The contents of this field may be printed in a font size ranging between 18 to 22-point sans serif type and be centered in an area beginning 2.25 inches from the left edge of the label and extending up to the right edge (approximately 1 inch). This field may not fall below 1.9375 inches from the top edge of the label Bin field 555 may contain the numeric designation of a separation on the sweepside of an item sorting machine or similar mechanized or automated mail distribution equipment. If ISS time and bin information are both available, ISS time receives priority over bin. The contents of this field may be printed in a font size ranging between 18 to 22-point sans serif type and be centered in an area beginning 2.25 inches from the left edge of the label and extending up to the right edge (approximately 1 inch). This field may not fall below 1.9375 inches from the top edge of the label. Bin field 555 may also be printed in a printer line of intra-facility labels.

Figure 6:
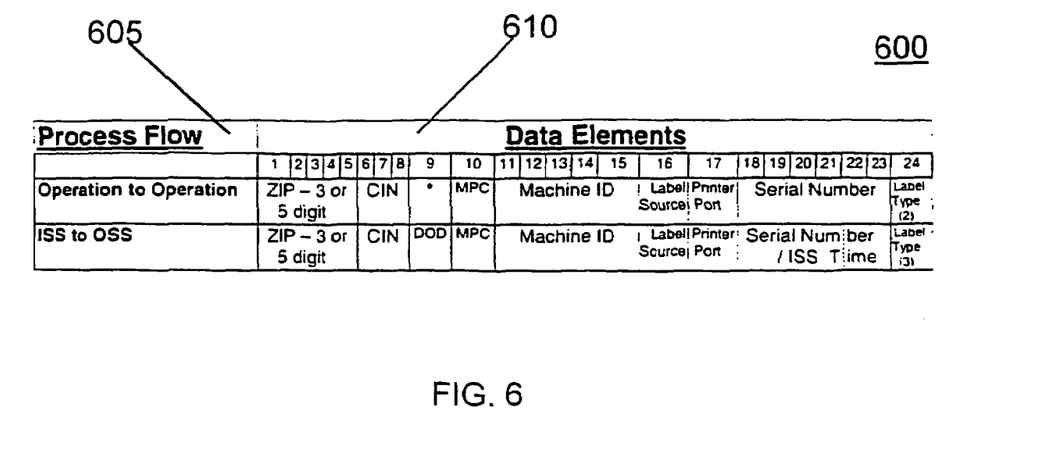
FIG. 6 is an illustration of an exemplary bar code content consistent with an embodiment of the present invention.

FIG. 6 shows an exemplary bar code content 600 that may be used in conjunction with exemplary intra-facility label 500 consistent with an embodiment of the present invention. FIG. 6 illustrates a two mail flows in process flow section 605, specifically, operation-to-operation, and ISS to OSS. In addition, FIG. 6 illustrates the partitioning of data elements in data element section 610 for the specific process flows shown.

For intra-facility label 500, the first five digits of bar code 560 may contain the destination ZIP code. The next three digits (digits 6 through 8) represent the CIN. Digit 9 may be DOD in the ISS-to-OSS flow, and may be unused in the operation-to-operation flow populated with a zero. The MPC, which may comprise digit 10, may operate as a switch to enable or disable tray dispatch (beyond the plant's physical boundaries) and also may operate as a mechanism to signal the need for a FHP weight transaction. Digits 11 through 15 may contain a five-digit machine ID of the piece of mail processing equipment that built the tray.

Digit 16 may identify the type of tray label production system that printed the label, and digit 17 may identify the printer that may generate the tray label. The elements of digits 16 and 17 not only may provide source information for managing the unique identification and serialization of tray labels, but they may also provide information that may be used to identify and isolate equipment that is not meeting print quality standards. For postal applications, for example, the number of printers attached to a 24-digit on-demand printer system may never exceed ten units on a single workstation. However, if the number of printers assigned to a productionworkstation did exceed 10 printers, the seventeenth digit may be used to identify the printers by groups of two, three, or more, for example.

Digits 18 through 23 may encode the serial number. For both process flows for FIG. 6, the digits of bar code 560 reserved for the unit load serial number, in combination with other data in the bar code, may create a unique ID for each unit load. Each unique ID (Serial Number in combination with other data in the bar code) may remain unique for a period of no less than 7 days. The last digit in both process flows for FIG. 6 may contain the label type. The ZIP code, CIN, and label type, along with the mail processing code (MPC), may provide the information necessary to direct the tray to its destination. In the RBCS ISS-to-OSS flow plants with RBCS capability at the MPE level, the first four digits of the serial number may consist of the ISS time, and the last two digits may reflect the time sequence.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An improved tracking label for tracking a processing path of a delivery item between two processing facilities en route from a sender to a destination, the tracking label comprising:
   a destination code field;
   a content identifier number (CIN) description field for a code describing contents of the delivery item associated with the tracking label;
   a bar code field including a label type indicating the two processing facilities and data elements based on the label type; and
   at least one of a printer line field, a destination name field, a tray sequence field, a dock door field, a transportation code field, and a no linear measurement field.

2. The label of claim 1, comprising means for associating the label with the delivery item in an item delivery system.

3. The label of claim 2, wherein the delivery item comprises at least one of a mail tray, a mail sack, a mail tub, a mailpiece, a United States Postal Service Priority Mail package, and a United States Postal Service Express Mail package.

4. The label of claim 1, wherein the two processing facilities are chosen from the group consisting of item processing plant, delivery unit, and exchange office/ISC.

5. An improved tracking label for tracking a processing path of a delivery item within a processing facility between a sender and a destination, the tracking label comprising:
   a next operation field;
   a content identifier number (CIN) description field for a code describing contents of the delivery item associated with the tracking label;
   a machine identifier field indicating a machine that last processed the delivery item within the processing facility;
   a bar code field including a label type indicating a type of processing within the processing facility and data elements based on the label type; and
   at least one of a printer line field, a destination name field, a last facility field, a route field, a bar code numeric line field, a day of delivery field, a tray sequence field, a dock door field, a transportation code field, and a no linear measurement code field.

6. The label of claim 5, comprising means for associating the label with the delivery item in an item delivery system.

7. The label of claim 6, wherein the delivery item comprises at least one of a mail tray, a mail sack, a mail tub, a mailpiece, a United States Postal Service Priority Mail package, and a United States Postal Service Express Mail package.

8. The label of claim 5, wherein the processing path is a mail flow through a United States Postal Service delivery system, and
   wherein the type of processing is one of plant-operations, input-subsystem-to-output-subsystem, plant-to-plant, plant-to-delivery-unit, plant-to-exchange-office, and delivery-unit-to-plant.

9. An improved method for providing a bar code used in conjunction with a tracking label for tracking a processing path of a delivery item between two processing facilities en route from a sender to a destination, the tracking label, the method comprising:

providing ZIP code data for the bar code;

providing a content identifier number (CIN) data for the bar code, the CIN data describing contents of the delivery item associated with the tracking label;

providing a label type for the tracking label that indicates the two processing facilities and data elements based on the label type;

providing data for the bar code comprising at least one of a printer line field, a destination name field, a tray sequence field, a dock door field, a transportation code field, and a no linear measurement field.

10. The method of claim 9, comprising associating the bar code with the delivery item in an item delivery system.

11. The method of claim 10, further comprising:

utilizing as the delivery item at least one of a mail tray, a mail sack, a mail tub, a mailpiece, a United States Postal Service Priority Mail package, and a United States Postal Service Express Mail package.

12. The method of claim 9, wherein the processing path is a mail flow through a United States Postal Service delivery system, and wherein the two processing facilities are chosen from the group consisting of item processing plant, delivery unit, and exchange office/ISC.

13. An improved method for providing a bar code used in conjunction with a tracking label for tracking a processing path of a delivery item within a processing facility between a sender and a destination, the method comprising:

identifying, on the tracking label, a next operation for the delivery item;

providing a content identifier number (CIN) data for the bar code, the CIN data describing contents of the delivery item associated with the tracking label;

providing a machine identifier indicating a machine that last processed the delivery item within the processing facility;

providing a label type for the tracking label that indicates a type of processing within the processing facility; and providing data for the bar code comprising at least one of a printer line field, a destination name field, a last facility field, a route field, a bar code numeric line field, a day of delivery field, a tray sequence field, a dock door field, a transportation code field, and a no linear measurement code field.

14. The method of claim 13, comprising associating the bar code with the delivery item in an item delivery system.

15. The method of claim 14, further comprising:

utilizing as the delivery item at least one of a mail tray, a mail sack, a mail tub, a mailpiece, a United States Postal Service Priority Mail package, and a United States Postal Service Express Mail package.

* * * * *